United States Patent [19]

Drake

[11] Patent Number: 4,645,749

[45] Date of Patent: Feb. 24, 1987

[54] WATER SOLUBLE COMPOSITIONS FOR PREPARING ANALYTICAL SOLUTIONS

[75] Inventor: Cyril F. Drake, Harlow, United Kingdom

[73] Assignee: Standard Telephones and Cables, PLC, London, England

[21] Appl. No.: 748,983

[22] Filed: Jun. 26, 1985

[30] Foreign Application Priority Data

Jul. 18, 1984 [GB] United Kingdom ............... 8418297

[51] Int. Cl.⁴ .............................................. C03C 3/16
[52] U.S. Cl. ................................... 501/45; 252/408.1
[58] Field of Search .................. 252/408.1; 501/45, 48

[56] References Cited

U.S. PATENT DOCUMENTS

| | | | |
|---|---|---|---|
| 2,370,472 | 2/1945 | King | 252/1 |
| 3,272,588 | 9/1966 | Fuchs | 423/305 |
| 3,640,827 | 2/1972 | Lutz | 501/48 |
| 4,449,981 | 5/1984 | Drake | 604/894 |
| 4,482,541 | 11/1984 | Telfer et al. | 424/128 |

FOREIGN PATENT DOCUMENTS

| | | | |
|---|---|---|---|
| 1078765 | 8/1967 | United Kingdom . | |
| 1149274 | 4/1969 | United Kingdom . | |
| 1155113 | 6/1969 | United Kingdom . | |
| 1298605 | 12/1972 | United Kingdom . | |
| 2057420 | 4/1981 | United Kingdom . | |
| 2073732 | 10/1981 | United Kingdom | 501/45 |

Primary Examiner—Helen M. McCarthy
Attorney, Agent, or Firm—Dennis P. Clarke

[57] ABSTRACT

Low concentration standard aqueous solution for analytical purposes is prepared from a water soluble glass body containing the standardizing material. The glasses are phosphorus pentoxide based glasses and provide release rates, e.g. of $Na^{++}$, of 0.01 to 100 micrograms per $cm^2$ per hour.

7 Claims, 1 Drawing Figure

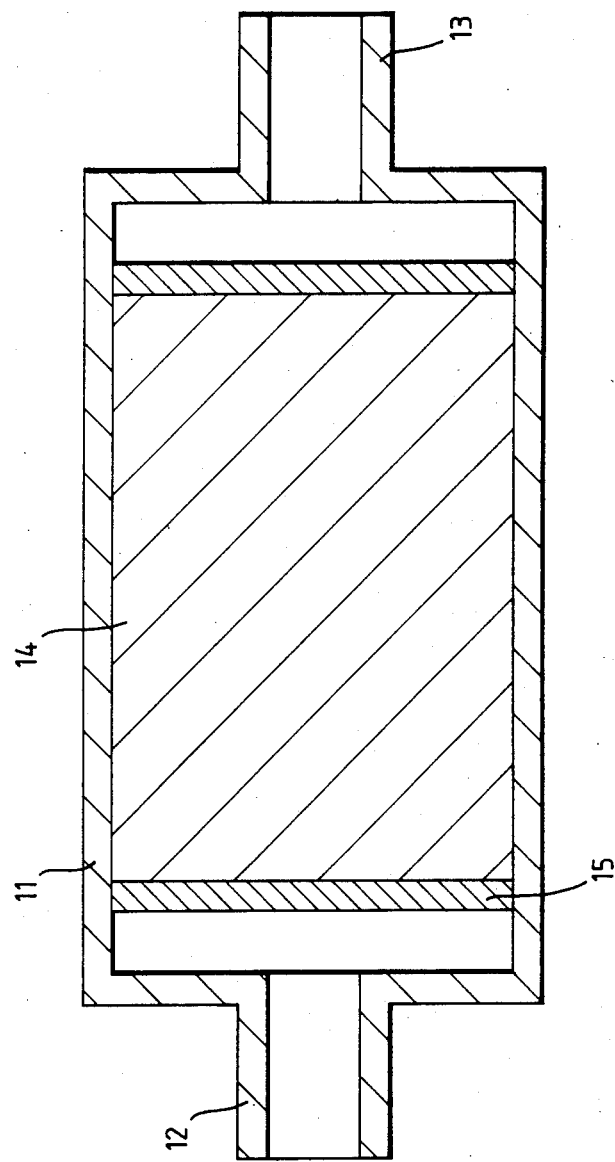

WATER SOLUBLE COMPOSITIONS FOR PREPARING ANALYTICAL SOLUTIONS

This invention relates to compositions for the preparation of analytical solutions, e.g. for use as reference standards in the measurement of the concentration of dissolved materials in water.

The analysis of water, e.g. for boiler feed use and the like, requires the measurement of low concentrations of metallic ions. For this to be effected by automatic on-line equipment it is necessary to provide test solutions of known concentration for the standardisation and checking of the equipment. As impurity levels to be measured are extremely small, typically in the parts per billion to parts per million range, it is difficult with conventional techniques to prepare standard test solutions to a sufficient accuracy for reliable checking of the equipment.

The object of the present invention is to minimise or to overcome this disadvantage.

According to one aspect of the invention there is provided a water soluble body for the preparation of an aqueous analytical solution by dissolution of one or more metallic ions at a predetermined rate, said body comprising a water soluble glass composition.

According to another aspect of the invention there is provided a cartridge for the preparation of an aqueous analytical solution, the cartridge comprising an inert housing having an inlet and an outlet for the passage of water therethrough, a water soluble body disposed in the housing and incorporating a material to be released into solution, and means for retaining said body within the housing, wherein the body comprises a water soluble glass composition.

According to a further aspect of the invention there is provided a water soluble glass composition for preparing an analytical solution, the composition comprising 2.6 to 27.8 mole % sodium oxide, 33.7 to 51.5 mole % calcium oxide and 38.5 to 45.9 mole % phosphorus pentoxide, the composition having a sodium ion dissolution rate in water at 38° C. of 0.3 to 10 micrograms $Na^+$ per $cm^2$ per hour.

As the glass has a substantially constant dissolution rate an analytical solution of known concentration can be prepared by immersing the glass body in deionised or distilled water for a predetermined period of time.

The ion, e.g. sodium, to be released into solution is incorporated into a glass composition that will dissolve at a controlled rate to release a known quantity of the ion within a fixed time period, or will release a known concentration of the ion into a stream of water in which the glass is immersed. In the latter case we have found that the concentration [x] of the released ion into the stream is given by the expression $[x] = (RC/F)$ where R is the dissolution rate of the glass in g/min, C is the weight concentration of the ion in the glass and F is the flow rate in l/min.

The glass dissolution rate may be determined by measuring the weight loss of a sample after 24 Hrs in distilled water flowing at a rate of 0.5 l/hr.

For the controlled release of sodium ions we prefer to employ phosphorus pentoxide based glass compositions in the range 2.6 to 27.8 mole % sodium oxide, 33.7 to 51.5 mole % calcium oxide, and 38.5 to 45.9 mole % phosphorus pentoxide, the first two oxides being glass modifiers and the latter oxide the glass former. Such glasses have sodium dissolution rates in the range 0.3 to 10 micrograms $Na^+$ per square centimeter per hour at 38° C.

It will be appreciated by those skilled in the art that although the glass compositions described herein are defined for convenience in terms of oxide components it is not necessary for the discrete oxides to be present in the glass. In general such glasses have a complex polyphosphate structure.

Typical sodium containing glasses within this preferred range have been prepared and their sodium ion dissolution rates determined at 38° C. These are listed in Table 1 below, the proportions being given in mole %.

TABLE 1

| Glass No. | $Na_2O$ | CaO | $P_2O_5$ | $R_{Na}$ |
|---|---|---|---|---|
| 1 | 2.6 | 51.5 | 45.9 | 0.32 |
| 2 | 12.1 | 40.4 | 47.4 | 2.9 |
| 3 | 27.8 | 33.7 | 38.5 | 9.9 |

In Table 1 $R_{Na}$ is the dissolution rate of sodium ions measured in $\mu g/cm^2/hr$ in deionised water at 38° C.

A further preferred range of water soluble glasses comprises the composition range 0.5 to 10 mole % $Na_2O$, 45 to 55 mole % CaO and 45 to 55 mole % $P_2O_5$. These glasses provide sodium ion release rates of 0.01 to 100 micrograms/$cm^2$/hr. The dissolution rate of all the glasses described herein can be adjusted if required by the addition of minor quantities of one or more further glass modifiers such as alumina which provide a reduction in the dissolution rate.

The glass compositions may be prepared by melting in an oxidising atmosphere measured quantities of the constituent oxide, or their precursors which decompose on heating to form the corresponding oxide, to obtain a homogeneous melt. This melt may then be cast into rods or pellets and its composition determined by conventional analytical techniques. As phosphorus pentoxide is volatile, we prefer to add an excess of this component in the original mix.

In use a body or pellet of the glass is immersed in deionised water for a predetermined period of time or is immersed in a stream of water of known volume flow rate. The concentration of the resulting standard solution is readily calculated from the dissolution rate of the glass and the water flow rate.

The glass may comprise a powder, granules or platelets. In the latter case it is preferred that the ratio between the largest diameter of the platelet and its thickness is at least 10:1 as this provides a substantially constant dissolution rate. In a further embodiment the glass may comprise a tube. If both the inside and the outside surfaces of a tube are in contact with water then the dissolution rates of such a body is substantially constant thus facilitating the calculation of solution concentration over a period of time.

It will be appreciated that the technique is not limited to the release only of sodium ions into solution. Thus analogous glasses can be made incorporating e.g. $K_2O$, $Li_2O$ or $Rb_2O$ to provide standard $K^+$, $Li^+$, $Rb^+$ solutions. Similarly a proportion of the calcium oxide content may be substituted with MgO or ZnO to provide $Mg^{++}$ or $Zn^+$ standard solutions. In further applications controlled release of transition metal ions and of anions such as $SO_4^{--}$, $F^-$, or $SiO_4^{---}$ may also be provided by suitable modification of the glass composition.

For use as an analytical reference standard a quantity of the glass in the form of powder or granules may be provided in a cartridge or capsule. Such an arrangement is shown in the accompanying drawing. The cartridge comprises an inert housing 11, e.g. of a plastics material, having inlet and outlet tubes 12, 13 for the passage of water through the housing. The glass 14 may be retained in the housing by inert water permeable elements 15. In use purified water is passed at a predetermined flow rate through the cartridge to provide a standard solution of the required concentration by dissolution of the glass.

I claim:

1. A water soluble body for the preparation of an aqueous analytical solution of a trace concentration of a metallic ion by dissolution of the body at a substantially constant predetermined rate, wherein said body consists of a water soluble glass composition incorporating phosphorus pentoxide as a glass forming oxide, wherein the glass incorporates glass modifying oxides including an oxide of said metal and calcium oxide, wherein the concentration of phosphorus pentoxide in the glass is between 38.5 mole percent and 45.9 mole percent, and wherein the calcium oxide concentration is between 33.7 mole percent and 51.5 mole percent such that, when contacted with pure water, the metallic ion is released at a rate of 0.01 to 100 micrograms per cm$^2$ per hour.

2. A body as claimed in claim 1, wheein the metallic ion is sodium, and wherein the sodium is provided in the form of sodium oxide at a concentration of 2.6 mole percent to 27.8 mole percent.

3. A body as claimed in claim 2 or 1 and in the form of a tube.

4. A body as claimed in claim 2 or 1 and comprising a plurality of platelets, wherein the ratio of the largest diameter to the thickness of said platelets is not less than 10:1.

5. A cartridge for the preparation of an analytical solution of a trace concentration of a metallic ion, the cartridge comprising an inert housing having an inlet and an outlet for the passage of water therethrough, a water soluble glass body disposed in the housing and adapted to release the metallic ion at a substantially constant predetermined rate on dissolution, and means for retaining the body in the housing, wherein said body consists of a water soluble glass composition incorporating phosphorous pentoxide as a glass forming oxide, wherein said glass incorporates an oxide of said metal and calcium oxide, wherein the concentration of phosphorus pentoxide in the glass is between 38.5 mole percent and 45.9 mole percent, and wherein the calcium oxide concentration is between 33.7 mole percent and 51.5 mole percent such that, when the glass is contacted with pure water, the metallic ion is released at a rate of 0.01 to 100 micrograms per cm$^2$ per hours.

6. A cartridge as claimed in claim 5, wherein said glass consists essentially of 2.6 to 27.8 mole % sodium oxide, 33.7 to 51.5 mole % calcium oxide and 38.5 to 45.9 mole % phosphorus pentoxide.

7. A standard analytical solution of a trace quantity of a cation prepared from a glass body as claimed in claim 1 or from a cartridge as claimed in claim 5.

* * * * *